United States Patent [19]
Wong et al.

[11] Patent Number: 6,130,940
[45] Date of Patent: Oct. 10, 2000

[54] LOCAL NUMBER PORTABILITY INTELLIGENT SIGNALING TRANSFER POINT

[75] Inventors: Ping Chi Wong, Plano; Janette Lin, Dallas, both of Tex.

[73] Assignee: Ericsson Inc., Research Triangle Park, N.C.

[21] Appl. No.: 08/928,697

[22] Filed: Sep. 12, 1997

[51] Int. Cl.[7] .................................................. H04M 3/42
[52] U.S. Cl. ...................... 379/220; 379/207; 379/220; 379/229; 379/230
[58] Field of Search .................... 379/207, 220, 379/230, 229

[56] References Cited

U.S. PATENT DOCUMENTS

| | | | |
|---|---|---|---|
| 5,481,603 | 1/1996 | Gutierrez et al. | 379/221 |
| 5,586,177 | 12/1996 | Farris et al. | 379/230 |
| 5,661,782 | 8/1997 | Bartholomew et al. | 379/67 |
| 5,696,816 | 12/1997 | Sonnenberg | 379/220 |
| 5,768,358 | 6/1998 | Venier et al. | 379/207 |
| 5,854,836 | 12/1998 | Nimmagadda | 379/207 |
| 5,883,950 | 3/1999 | Sonnenberg | 379/220 |
| 5,940,492 | 10/1999 | Galloway et al. | 379/230 |
| 5,943,411 | 8/1999 | Houck et al. | 379/219 |
| 5,970,131 | 10/1999 | Sonnenberg | 379/211 |

FOREIGN PATENT DOCUMENTS 0 792 074 A2   7/1997   European Pat. Off. .

OTHER PUBLICATIONS

Batni, The Intelligent Network's New Role, Telephony, Nov. 11, 1996, pp. 60–62.

Beller, Call Delivery to Portable Telephones Away from Home Using the Local Exchange Network, 1991, IEEE, pp. 0948–0953.

Primary Examiner—Krista Zele
Assistant Examiner—William J. Deane, Jr.
Attorney, Agent, or Firm—Jenkens & Gilchrist, P.C.

[57] ABSTRACT

A "Local Number Portability (LNP) intelligent Signal Transfer Point (STP)" which can perform a Local Number Portability (LNP) query towards a Service Control Point (SCP) and modify the incoming Initial Address Message (IAM) with the Location Routing Number (LRN) and the Ported Dialed Number (PDN), and indicate, using the Forward Call Indicator (FCI) (M-bit), whether the number has been translated. This advantageously allows non-Advanced Intelligent Network capable Service Switching Points (SSPs) (but Integrated Services Digital Network User Part, or ISUP, capable SSPs) to support Local Number Portability (LNP) without having to upgrade the SSP's. In addition, the LNP intelligent STP system provides AIN-capable SSPs with an alternative means of LNP, which reduces both the internal switching processes and the cost for the LNP query transactions.

34 Claims, 3 Drawing Sheets

LOCAL NUMBER PORTABILITY INTELLIGENT SIGNALING TRANSFER POINT

BACKGROUND OF THE PRESENT INVENTION

1. Field of the Invention

The present invention relates generally to telecommunications systems and methods for routing ported out calls, and specifically to performing Local Number Portability (LNP) queries by Signal Transfer Points (STPs).

2. Background and Objects of the Present Invention

Since the beginning of the telephone in the 1870's, signaling has been an integral part of telephone communications. The first telephone devices depended on the receiving party standing next to the receiver at the time of the call. Later, after the formation of the Bell Telephone Company, Alexander Graham Bell's assistant Watson invented the telephone ringer, eliminating the foreknowledge requirement. By lifting the receiver and allowing DC current to flow through the phone and back through the return of the circuit, a lamp would be lit on the exchange operator's switchboard to signal the operator that a call was trying to be placed.

However, early signaling methods were somewhat limited because they used the same circuit for both signaling and voice. In addition, they were analog and had a limited number of states, or values, that could be represented. In the early 1960's, Europe began digitizing the network, removing the signaling from the voice network, and placing the phone signals on a separate network. With this division of signaling and voice, the call setup and tear-down procedures required with every phone call were performed faster, while reserving the separate voice and data circuits for use when a connection was possible, e.g., no voice connection is needed when the called party's number is busy. Common Channel Signaling (CCS), which uses a digital facility, but places the signaling information in a time slot or channel separate from that of the voice or data it is related to, has become the foundation for telecommunications today.

In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. In the IN, everything is controlled or configured by workstations with user-friendly software. Telephone service representatives can, therefore, create new services and tailor a subscriber's service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. The basic infrastructure needed is composed of various signaling points, which both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

With reference now to FIG. 1 of the drawings, the many Service Switching Points (SSPs) 100 serve as the local exchanges in a telephone network 90, a portion of which is shown in FIG. 1. The SSPs 100 also provide an Integrated Services Digital Network (ISDN) interface for the Signal Transfer Points (STPs) 110, as is understood in the art. The ISDN is the subscriber interface to the IN.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

Presently, a subscriber on one SSP 100 has the ability to move to a different SSP 100 while retaining their public directory number. This is referred to as number portability. One key advantage of number portability is that other subscribers can connect to the portable subscriber without any changes to their dialing procedures.

If a subscriber has been ported out to another SSP 100, the Initial Address Message (IAM) sent by the originating SSP 100 must be modified to account for the change in the terminating SSP. The Local Number Portability (LNP) is the database that holds the Location Routing Number (LRN), which is a ten-digit number used to uniquely identify the switch that has the ported-out number. Specifically, the LRN is the number for the recipient switch, which is the switch that has ported in a number from another switch (called a donor switch). This ported-in number was not previously served by the recipient switch.

Typically, the SSP 100 sends a LNP query to the SCP 120, which accesses the LNP database in order to retrieve the routing information for a ported subscriber. The query response by the SCP 120 provides that SSP 100 with both the pertinent LRN, which is populated (that is placed) in the Called Party Number (CPN) parameter in the IAM, and the Ported Dialed Number (PDN), e.g., the actual dialed digits for the ported-out subscriber, which is placed in the Generic Address Parameter (GAP) in the IAM. The Forward Call Indicator (FCI) (M-bit) in the IAM is then updated to indicate that the number has been translated. The FCI M-bit is used as a fail-safe mechanism to prevent more than one LNP query from being launched on a call.

However, with non-AIN capable SSP's, the SSP's are unable to initiate the LRN query or receive LRN information from the SCP 120. Therefore, non-AIN capable SSPs have to be able to identify whether an incoming call terminates to its own switch from the Called Party Number (CPN) without the aid of the LRN. After a call is determined to not terminate on its own switch, the local SSP 100 routes the call according to its existing number analysis database. This involves routing the call to the aforementioned donor switch or a tandem (intermediate) switch that has LNP access capability. The donor or tandem switch then launches the query to determine routing, a process which results in excessive switching and delays.

However, if the first six digits of the CPN point back to the SSPs route (indicating that a number has been ported out), the call is typically transmitted to an affiliated exchange, over a dedicated route, by bilateral agreement, to handle routing for ported out subscribers from the non-AIN capable SSP 100. This process is also expensive and time-consuming, as is understood in the art.

It is therefore one object of the invention to allow non-AIN capable SSPs access to the LNP database without expensive upgrading.

It is a further object of the invention to reduce the switching processes and the cost associated with LNP queries by AIN-capable SSPs.

SUMMARY OF THE INVENTION

The present invention is directed to a "LNP Intelligent STP" which can perform a LNP query towards a SCP and modify the incoming IAM with the LRN (CPN) and PDN (GAP), and indicate, using the FCI (M-bit), whether the number has been translated. This advantageously allows non-AIN capable SSP's (but ISDN User Part (ISUP) capable SSPs) to support Local Number Portability (LNP) without having to upgrade the SSPs. In addition, the present invention provides AIN-capable SSPs with an alternative means of LNP, which reduces both the internal switching processes and the cost for the LNP query transactions. Furthermore, centralizing LNP in one STP benefits all serving SSP's by efficiently handling the LNP queries and allowing non-AIN capable SSPs to access the LNP database.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The Local Number Portability (LNP) intelligent Signal Transfer Points (STPs) 110 of a preferred embodiment of the present invention perform Location Routing Number (LRN) queries for ported-out numbers. Traditionally, the AIN-capable Service Switching Points (SSPs) 100 sent the LRN query to the Service Control Point (SCP) 120 and modified the Initial Address Message (IAM) accordingly, as described hereinbefore. This, however, burdens the SSP's 100 with numerous queries, which is an inefficient use of resources. In accordance with the present invention, however, by removing the LRN query to the STP 110, the LRN queries for all of the serving SSPs 100 (AIN and non-AIN capable) can be more efficiently handled.

Figure 1:
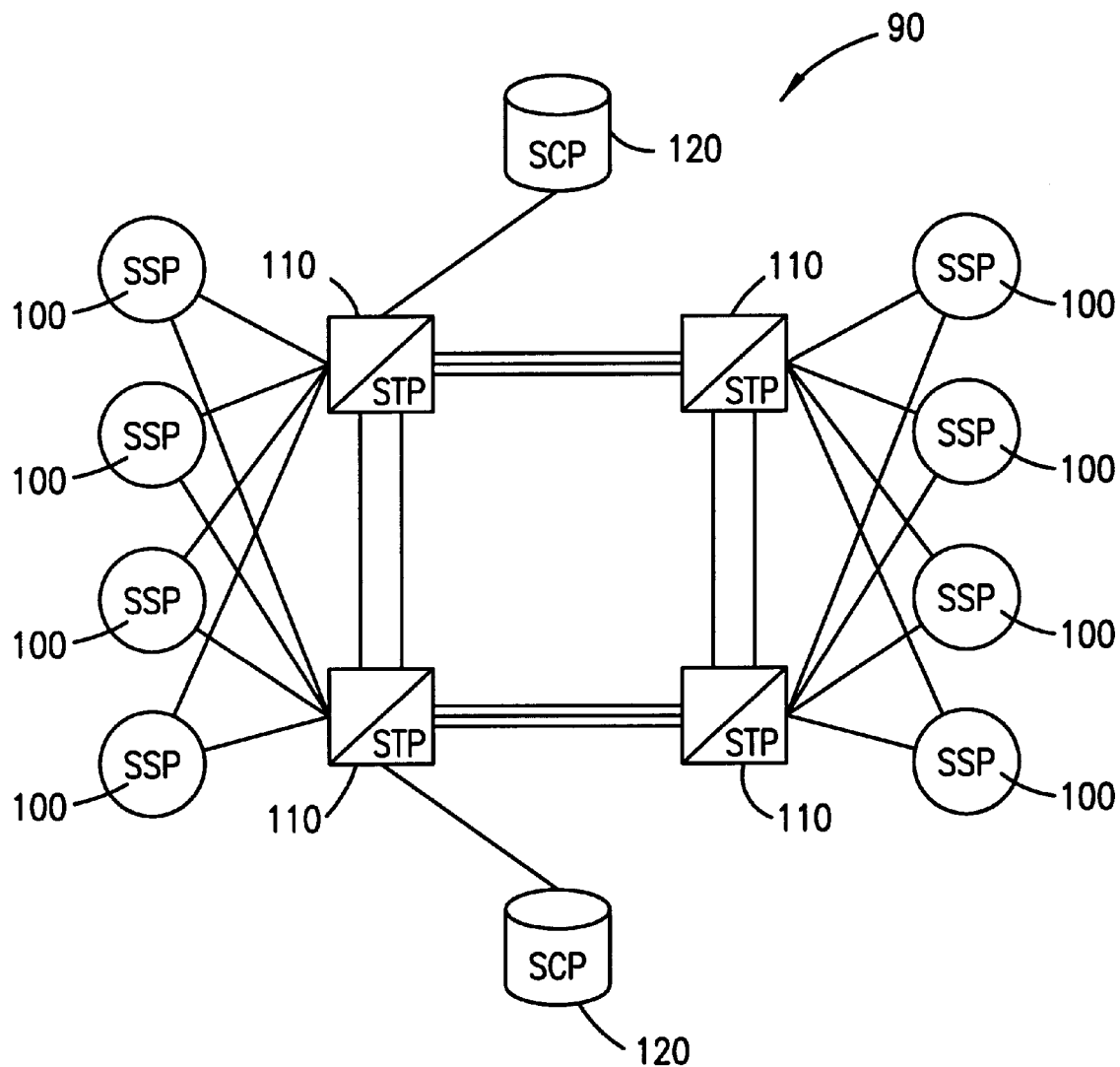
FIG. 1 is a block diagram illustrating some of the basic components used in an Intelligent Network or an Advanced Intelligent Network for signal switching.
Figure 2:
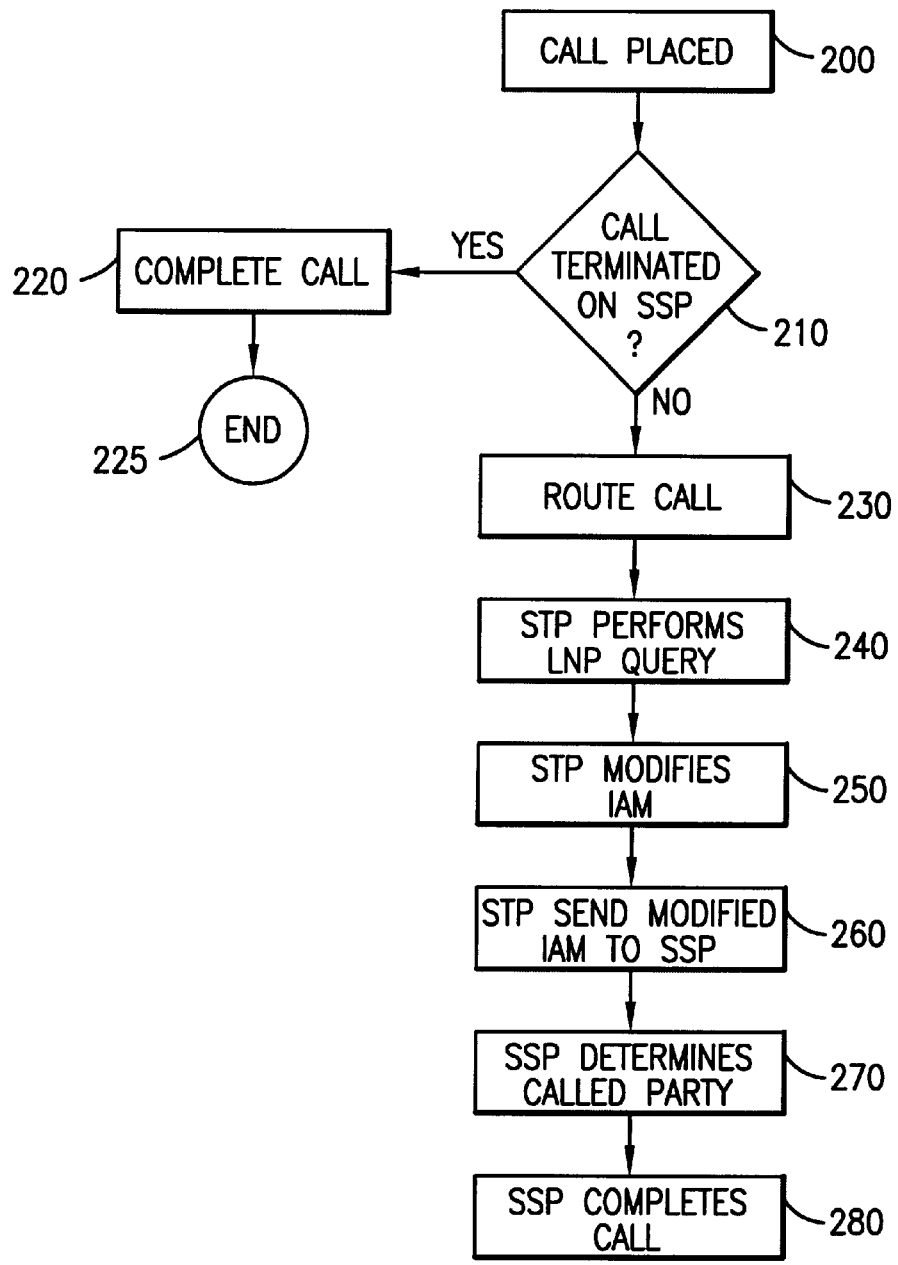
FIG. 2 is a flow chart describing a preferred embodiment of a LNP intelligent STP.

With reference now to FIG. 2 of the drawings, in the "LRN intelligent STP" system and method of the present invention, after a subscriber has placed a call (step 200), the SSP 100 responsible for that subscriber first determines if the call terminates on its own switch (step 210). If so, the SSP 100 completes the call to the called party (steps 220 and 225). If not, the SSP 100 formulates the Initial Address Message (IAM), seizes a channel, and sends the IAM to the tandem switch for further routing via an STP 110 (step 230). The STP 110 then intercepts the IAM and performs the LNP query (step 240). Based on the results of the LNP query, the STP 110 modifies the IAM (step 250) by inserting the Local Routing Number (LRN) in the Called Party Number (CPN) parameter and the Ported Dialed Number (PDN) in the Generic Address Parameter (GAP), and setting the Forward Call Indicator (FCI) (M-bit) to "Number Translated". The STP 110 then sends the modified IAM to the tandem switch for further routing to the recipient switch (step 260).

When the recipient switch receives the contents of the IAM and determines that the LRN is its location routing number, the recipient switch performs digit analyses on the dialed digits stored in the Generic Address Parameter to determine the identity of the subscriber (step 270), and completes the call (step 280).

If the end-user has not been ported out, the SCP 120 will return the actual dialed number, not the LRN, to be stored in the CPN parameter. In this case, the GAP is not included in the IAM. It should be noted that the FCI (M-bit) is always set to "Number Translated" after any LNP query, regardless of whether the end-user has been ported out or not.

Figure 3:
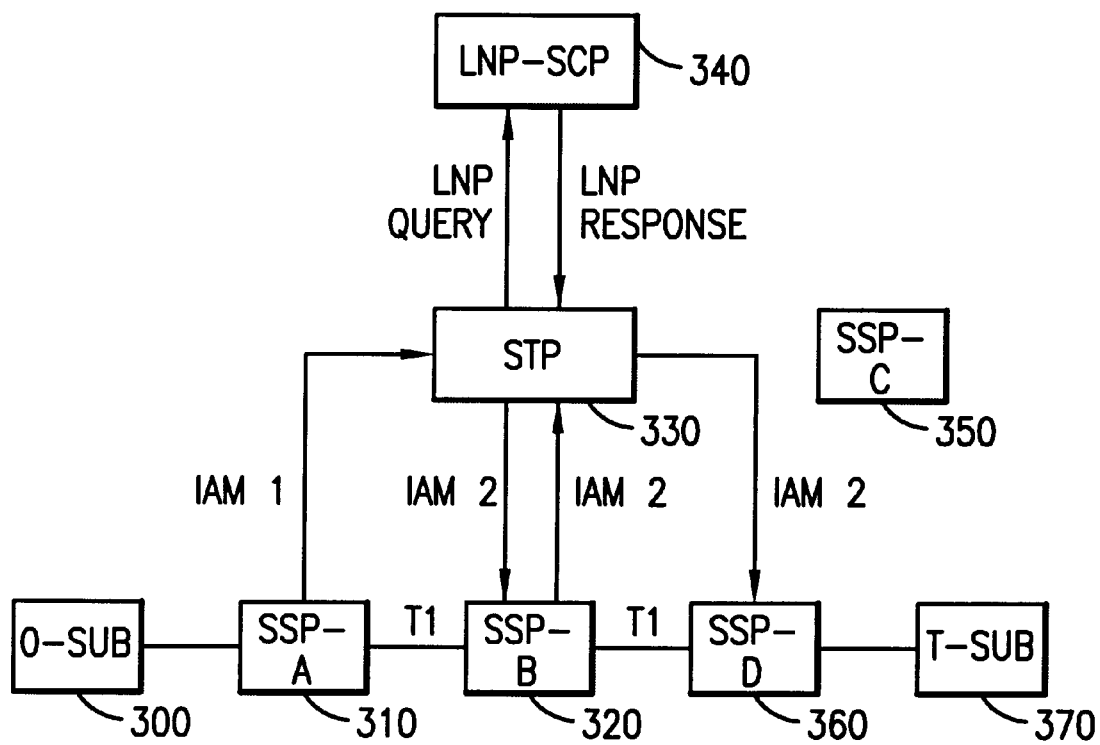
FIG. 3 is a block diagram demonstrating a preferred embodiment of the LNP intelligent STP system of the present invention.

The specific process parameters and routing loops are further illustrated in FIG. 3. As an example, in FIG. 3, an originating subscriber 300, also referred to herein as O-sub, is trying to place a call to a terminating subscriber 370, also referred to herein as T-sub, who has been ported out from a donor switch SSP-C 350 to a recipient switch SSP-D 360. An originating switch SSP-A 310 for subscriber O-sub 300 in this example is non-AIN capable, while the tandem switch SSP-B 320 may or may not be AIN capable.

After switch SSP-A 310 determines that the originating call does not terminate on its switch, it formulates an original Initial Address Message (IAM1) and seizes a physical channel T1 to route the call to SSP-B 320. The original IAM (IAM1) in this example contains the following information: Called Party Number parameter ="T"; and Forward Call Indicator (FCI) (M-bit)="Number not translated".

The STP 330 intercepts the aforementioned original IAM (IAM1) and performs a LNP query towards the SCP 340, as described hereinbefore. Based on the results received from the LNP response, also shown in FIG. 3, the STP 330 modifies the original IAM (IAM1) by placing the Location Routing Number (LRN) for the recipient switch SSP-D 360 in the Called Party Number parameter and the Ported Dialed Number (PDN) for subscriber T-sub 370 in the aforementioned Generic Address Parameter (GAP). The STP 330 also sets the FCI (M-bit) to "Number Translated", as discussed.

The STP 330 then sends out the modified IAM (IAM2) to the tandem switch SSP-B 320 for further processing. The tandem switch SSP-B 320 first determines if the call terminates at its switch. If so, it terminates the call to the end-user. If not, it sends the modified IAM (IAM2) to the STP 330 for routing of the IAM2 to the designated recipient switch SSP-D 360, and seizes a physical channel T1 to route the call to SSP-D 360. The recipient switch SSP-D 360 can then terminate the call on its switch to subscriber T-sub 370.

By enabling the STP 330 to perform the LNP query, SSP-A 310 can provide the LNP function even without being AIN-capable. In addition, tandem switch SSP-B 320 advantageously does not need to perform the LNP query even if the preceding switch is not AIN-capable, which reduces the call processing for SSP-B 320.

As will be recognized by those skilled in the art, the innovative concepts described in the present application can be modified and varied over a tremendous range of applications. Accordingly, the scope of patented subject matter should not be limited to any of the specific exemplary teachings discussed.

What is claimed is:

1. A telecommunications system for performing local number portability queries, said telecommunications system having a plurality of service switching points and a service control point in communication with said plurality of service switching points, said telecommunications system comprising:

a signal transfer point connected to said service control point and configured to receive an address message corresponding to a call originated by a calling subscriber associated with a first one of said service switching points from said first service switching point, said signal transfer point being further configured to generate a local number portability query based on said address message, transmit said local number portability query to said service control point and receive a response from said service control point;

wherein, based on said response, said signal transfer point modifies said address message to include routing information associated with a second one of said service switching points serving a called subscriber associated with said call.

2. The telecommunications system of claim 1, wherein said second service switching point is a recipient switch.

3. The telecommunications system of claim 1, wherein said first service switching point is non-AIN capable.

4. The telecommunications system of claim 1, wherein said first service switching point is AIN capable.

5. The telecommunications system of claim 1, wherein said service control point communicates with a local number portability database to perform said local number portability query.

6. The telecommunications system of claim 1, wherein said signal transfer point is further configured to route said call to said second service switching point using modified address message.

7. The telecommunications system of claim 1, wherein said address message comprises:

a Called Party Number parameter, a Generic Address parameter, and a Forward Call Indicator M-bit set to "Number not Translated".

8. The telecommunications system of claim 7, wherein said address message is modified by said signal transfer point by populating a location routing number in said Called Party Number parameter, placing a ported dialed number in said Generic Address parameter, and setting said Forward Call Indicator M-bit to "Number Translated".

9. The telecommunications system of claim 7, wherein said address message is modified by said signal transfer point by returning the actual dialed number into said Called Party parameter, and setting said Forward Call Indicator M-bit to "Number Translated."

10. A method for performing local number portability queries in a telecommunications system having a plurality of service switching points, each being in communication with a service control point, said method comprising the steps of:

receiving an address message at a signal transfer point from a first one of said service switching points, said address message corresponding to a call originated by a calling subscriber associated with said first service switching point;

generating, by said signal transfer point, a local number portability query based on said address message;

transmitting said local number Portability query from said signal transfer point to said service control point;

receiving, by said signal transfer point, a response to said local number portability query from said service control point; and modifying, by said signal transfer point, said address message, based on said response, to include routing information associated with a second one of said service switching points serving a called subscriber associated with said call.

11. The method of claim 10, wherein said second service switching point is a recipient switch.

12. The method of claim 10, wherein said first service switching point is non-AIN capable.

13. The method of claim 10, wherein said first service switching point is AIN capable.

14. The method of claim 10, wherein said service control point communicates with a local number portability database to perform said local number portability query.

15. The method of claim 10, further comprising the step of:

routing said call from said signal transfer point to said second service switching point using said modified address message.

16. The method of claim 10, wherein said address message comprises:

a Called Party Number parameter, a Generic Address parameter, and a Forward Call Indicator M-bit set to "Number not Translated".

17. The method of claim 16, wherein said address message is modified by said signal transfer point by populating a local routing number in said Called Party Number parameter, placing a ported dialed number in said Generic Address parameter, and setting said Forward Call Indicator M-bit to "Number Translated".

18. The method of claim 16, wherein said address message is modified by said signal transfer point by returning the actual dialed number into said Called Party parameter, and setting said Forward Call Indicator M-bit to "Number Translated."

19. A telecommunications system for routing a call to a called subscriber ported from a first service switching point to a second service switching point, said telecommunications system comprising:

an originating service switching point serving a calling subscriber associated with said call, said originating service switching point being configured to generate an address message corresponding to said call;

a signal transfer point connected to said originating service switching point, said signal transfer point being configured to receive said address message from said originating service switching point, generate a local number portability query based on said address message, receive a response to said local number portability query, modify said address message to include routing information associated with said second service switching point and route said call to said second service switching point using said modified address message; and a service control point in communication with said signal transfer point, said service control point being configured to receive said local number portability query from said signal transfer point and transmit said response to said signal transfer point.

20. The telecommunications system of claim 19, further comprising:

at least one tandem switch configured to receive said call and said modified address message and forward said call and said modified address message to said second service switching point.

21. The telecommunications system of claim 19, wherein said originating service switching point is non-AIN capable.

22. The telecommunications system of claim 19, wherein said originating service switching point is AIN capable.

23. The telecommunications system of claim 19, further comprising:

a local number portability database in communication with said service control point, said service control point using said local number portability database to perform said local number portability query.

24. The telecommunications system of claim 19, wherein said address message comprises:

a Called Party Number parameter, a Generic Address parameter, and a Forward Call Indicator M-bit set to "Number not Translated."

25. The telecommunications system of claim 24, wherein said address message is modified by said signal transfer point populating a location routing number in said Called Party Number parameter, placing a ported dialed number in said Generic Address parameter, and setting said Forward Call Indicator M-bit to "Number Translated".

26. The telecommunications system of claim 24, wherein said address message is modified by said signal transfer point returning the actual dialed number into said Called Party parameter, and setting said Forward Call Indicator M-bit to "Number Translated."

27. A method for routing a call to a called subscriber ported from a first service switching point to a second service switching point, said method comprising the steps of:

generating an address message corresponding to said call by an originating service switching point serving a calling subscriber associated with said call;

receiving said address message at a signal transfer point connected to said originating service switching point;

generating, by said signal transfer point, a local number portability query based on said address message;

transmitting said local number portability query from said signal transfer point to a service control point;

receiving, by said signal transfer point, a response to said local number portability query from said service control point;

modifying, by said signal transfer point, said address message, based on said response, to include routing information associated with said second service switching point; and routing said call to said second service switching point using said modified address message.

28. The method of claim 27, wherein said step of routing further comprises the steps of:

receiving said call and said modified address message at least one tandem switch; and forwarding said call and said modified address message from said at least one tandem switch to said second service switching point.

29. The method of claim 27, wherein said originating service switching point is non-AIN capable.

30. The method of claim 27, wherein said originating service switching point is AIN capable.

31. The method of claim 27, wherein said service control point communicates with a local number portability database to perform said local number portability query.

32. The method of claim 27, wherein said address message comprises:

a Called Party Number parameter, a Generic Address parameter, and a Forward Call Indicator M-bit set to "Number not Translated."

33. The method of claim 32, wherein said address message is modified by said signal transfer point populating a location routing number in said Called Party Number parameter, placing a ported dialed number in said Generic Address parameter, and setting said Forward Call Indicator M-bit to "Number Translated".

34. The method of claim 32, wherein said address message is modified by said signal transfer point returning the actual dialed number into said Called Party parameter, and setting said Forward Call Indicator M-bit to "Number Translated."

* * * * *

UNITED STATES PATENT AND TRADEMARK OFFICE
CERTIFICATE OF CORRECTION

PATENT NO : 6,130,940
DATED : October 10, 2000
INVENTOR(S) : Wong, et al.

It is certified that error appears in the above-identified patent and that said Letters Patent are hereby corrected as shown below:

Column 1, line 13     Replace "Backaround"
                          With --Background--

Column 5, line 57     Replace "using modified"
                          With --using said modified--

Column 6, line 21     Replace "Portability"
                          With --portability--

Signed and Sealed this

First Day of May, 2001

Attest:

NICHOLAS P. GODICI

Attesting Officer        Acting Director of the United States Patent and Trademark Office